Jan. 9, 1934.  W. R. GILLIES  1,942,546
INSULATING MATERIAL
Filed Jan. 7, 1931  2 Sheets-Sheet 1
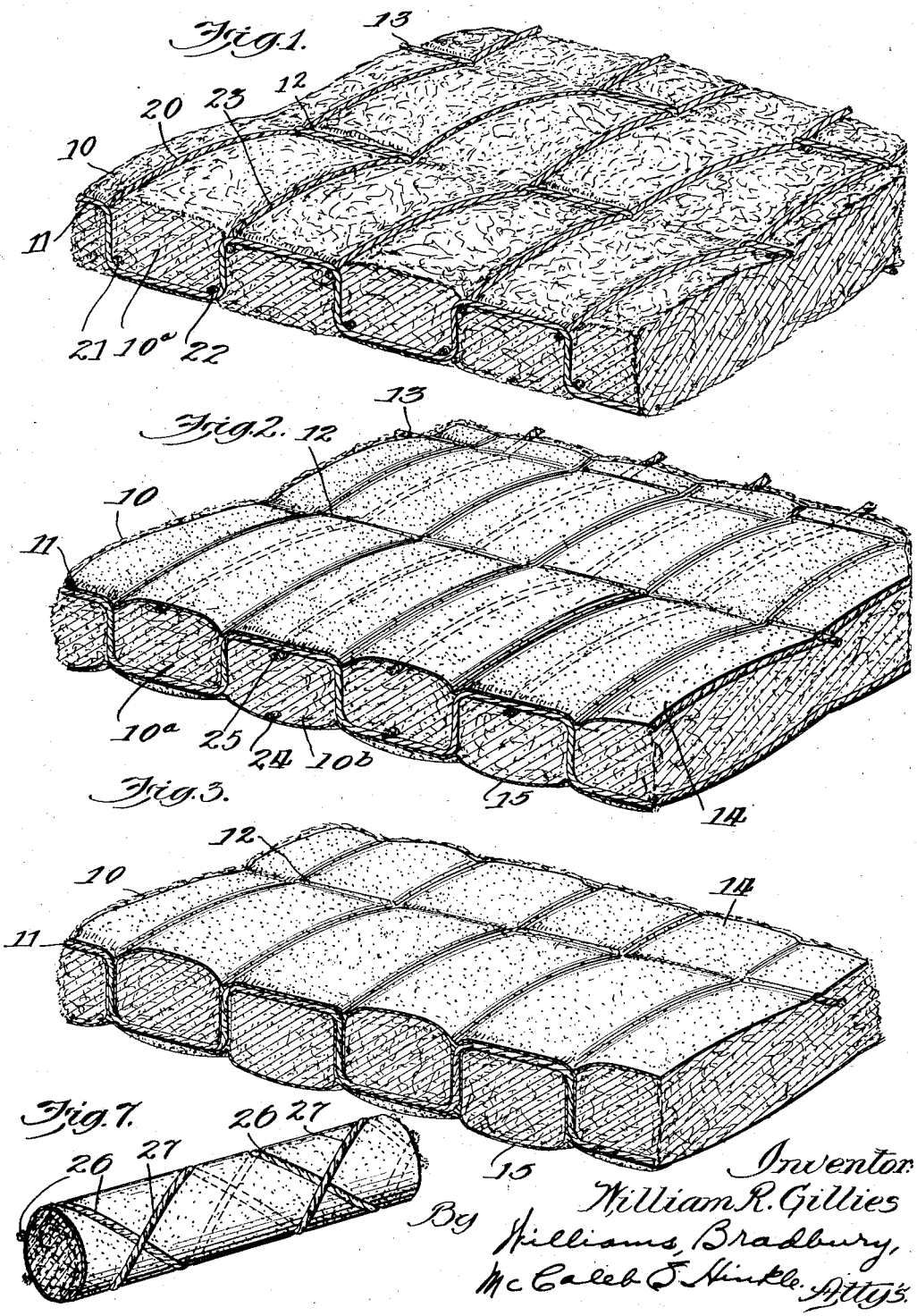

Jan. 9, 1934.  W. R. GILLIES  1,942,546
INSULATING MATERIAL
Filed Jan. 7, 1931  2 Sheets-Sheet 2
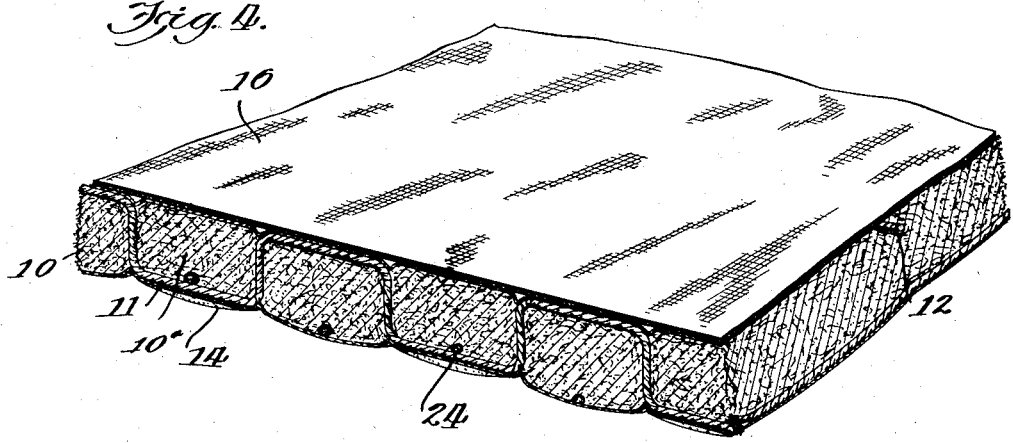
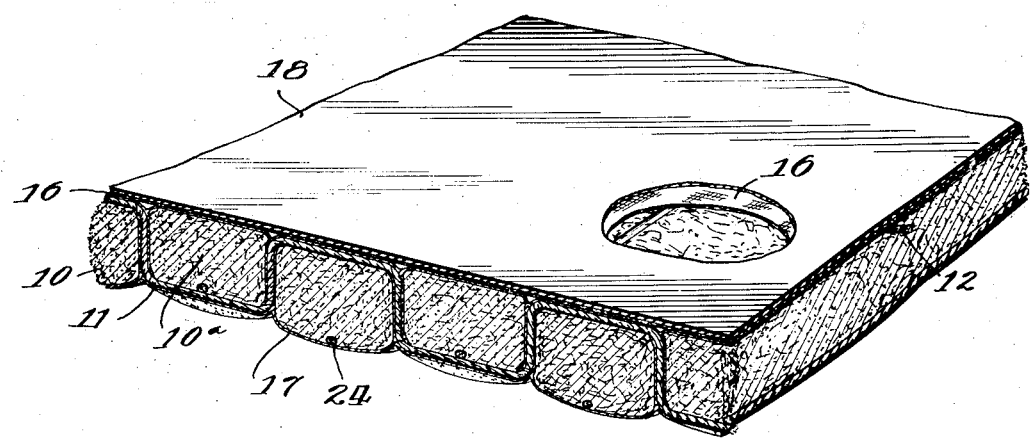
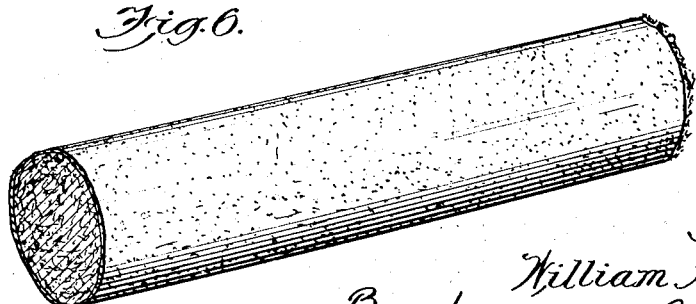
Inventor:
William R. Gillies
By Williams, Bradbury,
McCaleb & Hinkle
Attys.

Patented Jan. 9, 1934

1,942,546

UNITED STATES PATENT OFFICE 1,942,546

INSULATING MATERIAL

William R. Gillies, Chicago, Ill., assignor to Union Asbestos & Rubber Company, Chicago, Ill., a corporation of Illinois Application January 7, 1931. Serial No. 507,097

2 Claims. (Cl. 154—44)

The present invention relates to insulating material and is particularly concerned with heat insulating material made of asbestos or the like.

While the present heat insulating material is illustrated in the form of a sheet, best adapted to be used for insulation of refrigerator cars, refrigerators, boilers or flat work of all kinds, it should be understood that it may also be used for piping, and it may be made in sizes adapted to fit about piping, in strips or in any other form desired.

One of the objects of the invention is the provision of an improved heat insulating material having better insulating characteristics than the materials of the prior art.

Another object is the provision of an improved method of making heat insulation, which results in a product having more desirable characteristics than the products of the prior art.

Another object is the provision of an improved unit for the manufacture of heat insulation and a new method of treating asbestos to make a unit of the class described.

Another object is the provision of an improved form of asbestos heat insulation and an improved method of manufacture, which does not require the use of raw materials having greater tensile strength than the raw asbestos fibers.

Another object is the provision of an improved heat insulation which is lighter, softer, more nearly indestructible by heat and having better insulating characteristics.

Another object is the provision of an improved sheet insulation which possesses inherent resiliency so that it will not become compacted under violent and continuous vibration, such as that to which it is subjected when used in the walls of railway passenger cars, and so that the insulation is capable of retaining its normal expanded shape after long periods of compression.

Another object is the provision of a sheet insulation of the class described, which is non-combustible, flexible, capable of being penetrated by nails or other fastening means, durable, efficient and capable of being economically manufactured.

Other objects and advantages of the invention will be apparent from the following description and from the accompanying drawings, in which similar characters of reference indicate similar parts throughout the several views.

Referring to the drawings, of which there are two sheets;

Fig. 1 is a view in perspective, full size, of a piece of insulation constructed according to the present invention, showing one end of the insulation in section at one of the longitudinal warp threads.

Fig. 2 is a similar view of another modified form of insulation of the same type as Fig. 1, but having the upper and lower surfaces sprayed with an adhesive gum to enclose and protect the body of the insulation;

Fig. 3 is a similar view of another modified form, in which each of the units of the insulation has been sprayed with an adhesive gum or cement, forming gummed fiber enclosures for both sides of the sheet and between the respective units thereof;

Fig. 4 is a similar view of another modification in which the material of the type of Fig. 2 has been provided with a woven fabric backing to increase the tensile strength and protect the exterior of the insulation after it has been applied;

Fig. 5 is another similar view of another modification in which material of the type of Fig. 3 has been provided with a backing of the type of Fig. 4;

Fig. 6 is a view in perspective of one of the asbestos insulation units from which the present sheet insulation may be manufactured, and which form the main body of the sheet insulation.

Fig. 7 is a similar view of a modified unit.

Under the conditions existing where sheet insulation is used in railway cars, the constant vibration of the walls and impact on the wall members between which insulation is held, soon results in the compacting of the fibers of the insulation of the prior art, reducing the desired heat and sound insulating qualities to a small fraction of their original value. The heat insulating value of an asbestos fiber structure increases with the arrangement of the fibers in loose, soft, fluffy condition, and decreases as the fibers become twisted or compacted together, and it will be evident, therefore, that it is highly desirable to have the body of asbestos heat insulating material in the most loose and fluffy condition, forming a large percentage of dead air spaces between the fibers.

This fluffy condition, however, is incompatible with the requirements of modern weaving machines, which ordinarily cannot be arranged to weave material that does not have a predetermined amount of tensile strength, and most materials of the prior art have necessarily had the asbestos fibers arranged in the form of ropes, consisting of threads of asbestos fibers intermixed with cord or other materials having greater tensile strength, tightly twisted together to form a rope of relatively compact characteristics.

In my prior patent, No. 1,470,723, the asbestos fiber body of that insulating material was arranged in the form of rovings having the asbestos fibers loosely twisted to form large, loose and soft asbestos filling members having a small amount of tensile strength, but having a relatively high heat insulation value on account of the arrangement of the asbestos fibers.

Referring to Fig. 6, this is a view in perspective of a length of a heat insulating unit used in manufacturing the present type of heat insulation and the heat insulation constructed according to the present invention, preferably includes the loosely arranged fibers of asbestos located at random as the fibers are located when they come from the card, and this form of asbestos fiber is usually termed "sliver".

The present heat insulation is preferably made of asbestos fibers in the form of sliver, in order to secure a maximum heat insulating value, although the fibers in this form are so loose that they do not possess the tensile strength which is necessary to weave insulation on ordinary weaving machines.

The body of the insulation thus constructed has more desirable heat insulating characteristics and may be more economically manufactured than the devices of the prior art, on account of the elimination of intermediate operations required in the manufacture of the prior heat insulation, but in order to manufacture the present insulation in quantity, the present improved method of manufacture is preferably followed.

Since the fibers in the form of sliver have practically no tensile strength, the present insulation units must be suitably supported during the weaving operation, and cannot be drawn from a reel like asbestos ropes. The present heat insulation may be manufactured by hand, as well as by improved machines, and consequently it is not necessary to describe the machines in detail in this application, but the machines will be made the subject of a separate application for patent.

The fibers in the form of sliver are taken from a container and suitably supported upon a trough-like member to form an elongated insulating member of loose sliver, which takes the shape of the trough in which it is supported, but which assumes a substantially flat or rectangular cross-section when located in the sheet insulation.

The heat insulating units are preferably surrounded with asbestos fibers matted together with an adhesive gum to provide a protective covering for maintaining the shape and identity of the insulating units, and the covering of adhesive gum may be provided by spraying the asbestos sliver insulating member as the trough is withdrawn from beneath the member or at any other time during its formation.

Referring to Fig. 6, this is an insulating unit constructed of sliver fibers and having an exterior covering of adhesive gum, such as gum arabic sprayed on the outside fibers. It should be understood that the layer of gum does not completely enclose the sliver insulating member, but the gum causes the outer fibers to adhere together, forming a rather thin outer covering of fibers cemented together.

The insulating members or units 10 are preferably maintained in proper relative position by being interwoven with warp threads 11 of asbestos or asbestos mixed with cotton or other vegetable or animal fibers, and the warp threads 11, 12, 13, etc., are preferably oppositely arranged as shown in Figs. 1 to 3. That is, the warp thread 11 passes over the insulating sliver member 10, under the insulating member 10a, over the insulating member 10b, etc. The warp thread 12 passes under the insulating member 10, over the insulating member 10a, under the insulating member 10b, etc.

Where the insulating units of fibers in the form of sliver are sprayed with adhesive gum, the threads 11, 12, 13 are likewise engaged with portions of the gum, and thus secured in place. In some embodiments of the invention, the sheet insulation may be constructed without the use of gum, and this type of material is illustrated in Fig. 1, which is also exemplary of an intermediate product in the manufacture of the other forms of material shown in Figs. 2 to 5.

In the embodiment of Fig. 2, the upper and lower surfaces of the sheet insulation have been sprayed with adhesive gum, such as gum arabic, thereby cementing an exterior layer of fibers together at the top and the bottom to protect the main body of the sheet insulation.

In the embodiment of Fig. 3, the separate insulating units of sliver fibers have been sprayed with gum arabic or other cement, upon all sides so as to maintain the identity of the separate units from which the sheet insulation is made, and the sheet insulation has also been provided with exterior layers of gum 14 and 15 at the top and bottom.

The material illustrated in Fig. 4 is substantially the same as that shown in Fig. 2, with the addition of a backing 16 of woven fabric, such as cambric, canvas, cotton fabric, crinoline, burlap, asbestos fabric or the like. The fabric backing 16 is secured to the sheet insulation by the same layer of gum 14 which cements the upper and exterior fibers of the insulation together, and the backing 16 may form the exterior covering of a piece of sheet insulation of sufficient size to wrap around a pipe, the backing being lapped.

Referring to Fig. 5, this type of insulation is similar to that of Fig. 3, with the addition of the backing 16 of the same material as shown in Fig. 4, and described above.

The insulating sliver members of Fig. 5 are maintained in proper position by the warp threads 11—13, and the identity of the separate insulating members is maintained by the exterior coating of adhesive gum 17 about each insulating member.

The present insulating material, preferably, but not necessarily, includes a plurality of asbestos threads 20—25 extending longitudinally of the sliver insulating units, in order to increase the tensile strength of the finished material in that direction. The threads 20—25 extend transversely to the warp threads 11—13 and are susceptible of a number of different arrangements, but ordinarily are not required on the same side where the packing sheet 16 is placed.

Thus in Fig. 4 a number of weft threads 24 extend longitudinally of the sliver insulating units and are secured thereto at its lower side by the adhesive gum and/or by being placed under the warp threads 11—13.

In Fig. 2 the threads 24—25 have been used on both sides of the insulating material, and in Fig. 1 the threads 20—23 have been located at the corners of the insulating units inside the warp threads.

It should be understood that many modifications of the arrangement of warp and weft threads may be made, and if desired the sliver unit may be surrounded by spirally extending threads 26 and 27 crossing each other and enclosing the sliver as shown in the modified unit of Fig. 7.

The present insulating material may be woven in machines provided with troughs for supporting the insulating members of sliver until they have been sprayed and located in the body of the sheet insulation, but due to the fact that the sliver has no tensile strength as a whole, the insulating members must be carried or conveyed into proper position instead of being drawn, and it will thus be observed that a new method of treatment of the asbestos fibers is necessary for the manufacture of the present material.

The present heat insulation is softer and has better heat insulating characteristics than the materials of the prior art. Its fibers are in the best condition for preventing the transmission of heat and the dead air spaces between the fibers are at a maximum, as distinguished from the devices of the prior art. The present material may be subjected to vibration without compacting the sheet insulation, or causing deterioration of its heat insulating value, and the present material may also be manufactured very economically.

While I have illustrated a preferred embodiment of my invention, many modifications may be made without departing from the spirit of the invention, and I do not wish to limit myself to the precise details of construction set forth, but desire to avail myself of all changes within the scope of the appended claims.

Having thus described my invention, what I claim is new and desire to secure by Letters Patent of the United States, is:

1. A unit for construction of heat insulating material comprising an elongated insulating member constructed of dry asbestos fibers in the form of sliver as it comes from the card, said sliver fibers being arranged side by side and having the outermost fibers of said elongated member matted together with and enclosed with a layer of gum arabic cement, giving said unit a predetermined shape and sufficient tensile strength to maintain its form, and a plurality of cords spirally wound about said unit and embedded in said gum arabic cement to give said unit sufficient tensile strength to be handled upon a reel.

2. A heat insulating material comprising a plurality of separate heat insulating units, each unit comprising an elongated insulating member constructed of dry asbestos fibers in the form of sliver as it comes from the card, said sliver fibers being arranged side by side and having the outermost fibers of said elongated member matted together with and enclosed with a layer of gum arabic cement, giving said unit a predetermined shape and sufficient tensile strength to maintain its form, and a plurality of cords spirally wound about said unit and embedded in said gum arabic cement to give said unit sufficient tensile strength to be handled upon a reel, a plurality of transversely extending cords interwoven with said plurality of units to hold said units side by side, and an auxiliary layer of gum arabic cement extending over one of the sides of said units and from one unit to another to unite said units into sheets of substantially uniform heat insulating characteristics.

WILLIAM R. GILLIES.